United States Patent [19]

Higeta et al.

[11] Patent Number: 4,587,399

[45] Date of Patent: May 6, 1986

[54] THERMAL HEAD

[75] Inventors: Kazuya Higeta; Kazumasa Fujioka; Takeo Nemoto; Takahiro Daikoku; Isao Nakajima, all of Ibaraki, Japan

[73] Assignee: Hitachi, Ltd., Tokyo, Japan

[21] Appl. No.: 683,499

[22] Filed: Dec. 19, 1984

[30] Foreign Application Priority Data

Dec. 26, 1983 [JP] Japan ............................... 58-243981

[51] Int. Cl.4 .......................... B47J 3/20; G01D 15/10

[52] U.S. Cl. ................................ 219/216; 346/76 PH

[58] Field of Search ............ 219/216 PH; 346/76 PH; 400/120

[56] References Cited

FOREIGN PATENT DOCUMENTS

| | | | |
|---|---|---|---|
| 56-34467 | 4/1981 | Japan | 400/120 |
| 58-13703 | 3/1983 | Japan . | |
| 58-203070 | 11/1983 | Japan | 219/216 PH |
| 58-199175 | 11/1983 | Japan | 400/120 |

OTHER PUBLICATIONS

"Adding Heat Sink Improves . . . ", Electronics, vol. 49, No. 16, p. 5E, Aug. 5, 1976.

Tokunaga, Yukio, "Life Estimation of Thermal Print Heads . . . ", IEEE Trans. on Compon., Hyb., and Manuf. Tech., vol. CHMT4, No. 1, Mar. 1981, pp. 148–153.

*Primary Examiner*—C. L. Albritton

*Assistant Examiner*—Teresa J. Walberg

*Attorney, Agent, or Firm*—Antonelli, Terry & Wands

[57] ABSTRACT

A thermal head is provided with a heat accumulating member disposed on a substrate, a plurality of heating resistors juxtaposed on the heat accumulating member in a manner to be spaced from each other, electrodes for supplying electric power to the heating resistors, and a protective member for preventing oxidation and wear of the heating resistors and the electrodes, these constituents being formed as layers. When the electric power is supplied to the electrodes, heat is generated by a heating portion of the heating resistor corresponding to the electrodes, and it is transmitted to a head surface via a thermally conductive member disposed in a printing dot portion of the protective member. The heat from the printing dot portion is used for effecting printing on a medium to-be-recorded through a thermosensitive sheet which lies in contact with the head surface.

18 Claims, 13 Drawing Figures

THERMAL HEAD

BACKGROUND OF THE INVENTION

1. Field of the Invention

The present invention relates to a thermal head for use in a thermographic printer, for example more particularly, it relates to a thermal head which comes into favorable touch with a thermosensitive sheet, such as inked film or heat-sensitive color developing paper, exhibits a high thermal responsiveness and establishes the optimum temperature distribution on the surface of the head and which is therefore well-suited for printing of high resolution and high quality at high speed.

2. Description of the Prior Art

In general, a thermal head comprises a substrate made of ceramics or the like, a heat accumulating member layered on the substrate, and a plurality of minute heating resistors arranged on the surfacer of the heat accumulating member, as disclosed in, e.g., IEEE TRANSACTIONS ON COMPONENTS, HYBRIDS, AND MANUFACTURING TECHNOLOGY, VOL CHMT-4, No. 1, MARCH 1981. The heating resistors are respectively provided with electrodes for feeding electric power. A protective member is layered so as to cover the heating resistors and the electrodes. The protective member consists of the two layers of an oxidation-proof layer for preventing oxidation and a wear-proof layer for preventing the wear of the oxidation-proof layer. With some materials, the protective member can serve as both the oxidation-proof layer and the wear-proof layer. In this case, the protective member is formed of a single layer.

In the printing mechanism of a thermographic printer which includes this thermal head, the heating resistor is energized via the electrodes. Upon the energization, the heating resistor generates heat in its heating portion. Via the protective member, the heat is transmitted from the printing dot portion of a head surface to a thermosensitive sheet. In a case where the thermosensitive sheet is an inked film by way of example, the heat melts the ink of an ink layer, and the ink is applied to a medium to-be-recorded such as printing paper, so as to perform printing. Besides, in a case where the thermosensitive sheet is a heat-sensitive color developing paper by way of example, the heat is transmitted to a color developing layer, which develops a color so as to perform printing. Upon completion of the printing, the heating resistor is deenergized and is sufficiently cooled to the degree at which no printing is possible. Thereafter, the relative position between the thermal head and the medium to-be-recorded is shifted to the next printing position (usually, a position shifted by one dot), whereupon the series of printing operations described above are repeated.

In order to realize high speed printing, accordingly, it is required that the thermal responsiveness of the head is high, namely, that the heat generated by the heating portion of the heating resistor is quickly transmitted to the printing dot portion to raise the temperature of the dot portion up to a point necessary for melting the ink layer or for causing the heat-sensitive color developing paper to develop a color and that the heating resistor is thereafter cooled quickly. From the viewpoint of the printing quality, it is desirable that only the temperature of the printing dot portion on the heating portion rises uniformly and that the temperature of the surrounding head surface including the adjacent dot portions remains unchanged.

In general, the printing density depends greatly upon the contact pressure between the printing dot portion and the thermosensitive sheet.

More specifically, in a case where the contact pressure between the printing dot portion and the thermosensitive sheet is not higher than a predetermined value, the printing density increases with the contact pressure, and in a case where the contact pressure exceeds the predetermined value, the printing density becomes constant irrespective of the contact pressure. The shape of the surface of the thermal head accordingly needs to be such that the contact pressures between the printing dot portions and the thermosensitive sheet are uniformly distributed within, at least, the printing dot portions.

Usually, the prior-art thermal head has the printing dot portion lowered stepwise with respect to the head surface. For this reason, the contact pressures between the printing dot portion and the thermosensitive sheet do not become uniform. Particularly within the printing dot portion which is very important for the printing quality, the outer side has a lower contact pressure. At the end part of the printing dot portion, therefore, a gap arises between the printing dot portion and the thermosensitive sheet. As a result, the area of a printed dot becomes smaller than that of the printing dot portion, and the printed dot is not clearly demarcated from the surrounding dots. Moreover, the pressing force between the thermal head and the thermosensitive sheet fluctuates inevitably on account of the structure wherein the printing is repeated while the thermal head and the thermosensitive sheet are moving relatively. The fluctuation of the pressing force has incurred a fluctuation in the size of the gap between the printing dot portion of the head and the thermosensitive sheet, that is, a fluctuation in the size of the printed dot, resulting in the degradation of the picture quality. In addition, the inferior contact state between the printing dot portion of the thermal head and the thermosensitive sheet as described above increases the contact thermal resistance between the two. This has caused a great temperature difference between the printing dot portion and the thermosensitive sheet. Accordingly, the temperature of the printing dot portion has needed to be very high in order to melt the ink of the ink layer in the case of the inked film as the thermosensitive sheet or to develop a color in the case of the heat-sensitive color developing paper. Besides, the heat generated by the heating portion of the heating resistor and conducted within the protective layer toward the printing dot portion propagates to the surroundings due to the great contact thermal resistance between the printing dot portion and the thermosensitive sheet, so that it raises the temperature of the head surface around the dot portion including the adjacent printing dot portions. This has incurred such degradation of the printing quality that the printed dots are not clearly demarcated or that they spread widely.

Although the various disadvantages mentioned above are somewhat improved by increasing the pressing force between the thermal head and the thermosensitive sheet, the protective member wears off heavily to shorten the lifetime of the head. On the other hand, when the pressing force is too great, there occurs a phenomenon called pressure transfer or pressure color development in which the ink is transferred to the paper or the heat-sensitive color developing paper develops a color without the application of heat.

As a measure intended to improve such disadvantages, though it relates to a thermal pen, an example in which printing dot portions are made of diamond and in which the diamond is protruded above a head surface has been disclosed in the official gazette of Japanese Utility Model Registration Application Publication No. 58-13703. In this structure, however, the gradient of a contact pressure within the printing dot portion is rather greater than in the prior-art structure, and the contact area between the printing dot portion and the thermosensitive sheet differs greatly depending upon the pressing force between the two, so that the printing quality has been similarly low.

In the thermal head of the prior-art structure, the protective member is made of a material whose thermal conductivity K is as inferior as approximately $10^{-2}$–$10^{-3}$ $cm^2/s$ (for example, $SiO_2$ or $Ta_2O_5$), and since it endures wear and serves for preventing the oxidation of the heating resistors as well as the electrodes, it is formed at a uniform thickness which is approximately 5–10 μm. Therefore, the thermal resistance between the heating portion of the heating resistor and the printing dot portion of the head surface becomes very high, which has caused a great temperature difference between the heating portion and the printing dot portion. Accordingly, the temperature of the heating portion needs to be very high in order that the temperature of the printing dot portion of the head surface may be raised up to a point required for printing. In order to perform high speed printing with such thermal head, the temperature of the printing dot portion of the head surface needs to be raised up to the predetermined point in a short time. Therefore, input power to the heating resistor increases, and the temperature of the heating resistor becomes higher than in case of low speed printing, so that the head might be destroyed. Also for cooling after the cutoff of the input power, a long time is naturally required. Thus, enhancement in the speed of the printing has been limited.

A further disadvantage has been that, since the thermal resistance from the heating portion of the heating resistor to the printing dot portion of the head surface is high, much heat leaks to the surroundings, so the greater part of the input power to the heating resistor is not utilized for printing.

SUMMARY OF THE INVENTION

The present invention has for its object to provide a thermal head which comes into favorable touch with a thermosensitive sheet under uniform contact pressures and which establishes a temperature distribution suitable for the printing quality on the surface thereof, whereby printing of high quality and high speed is permitted.

The thermal head of the present invention is characterized in that a thermally conductive material higher in the thermal conductivity than a protective member is disposed in the parts of the protective member corresponding to heating portions so as to flatten the surface of the head, whereby the touch between the head and a thermosensitive sheet at the printing dot portion of the head surface is improved to render the contact pressure between the two uniform within the printing dot portion and to suppress non-uniformity in a printing density and fluctuation in a dot area so as to enhance the quality of printing, and whereby a thermal resistance from the heating portion of a heating resistor through the printing dot portion of the head surface to the thermosensitive sheet is reduced to cause heat generated by the heating portion of the heating resistor to quickly arrive at the printing dot portion of the head surface and further at the thermosensitive sheet without leaking to the surrounding, conversely the heat being quickly radiated at cooling, and to decrease temperature differences between the heating portion of the heating resistor and the printing dot portion of the head surface and between the head surface and the thermosensitive sheet.

DETAILED DESCRIPTION OF THE INVENTION

Figure 1:
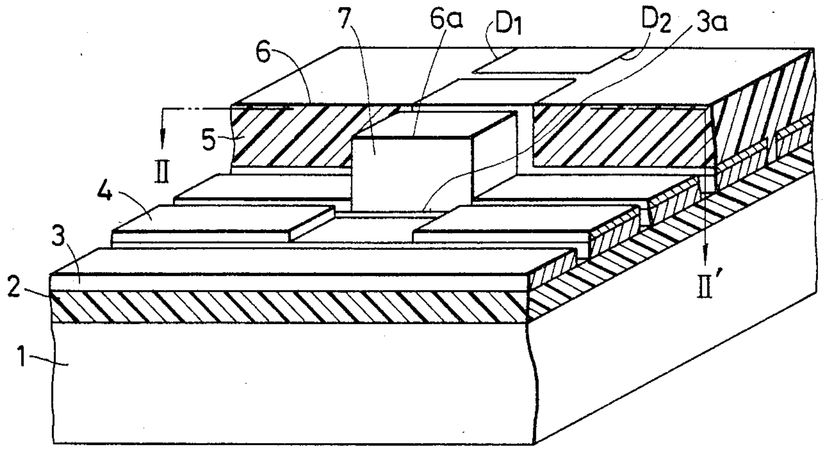
FIG. 1 is a perspective sectional view, partly cut away, showing the essential portions of an embodiment of a thermal head according to the present invention.
Figure 2:
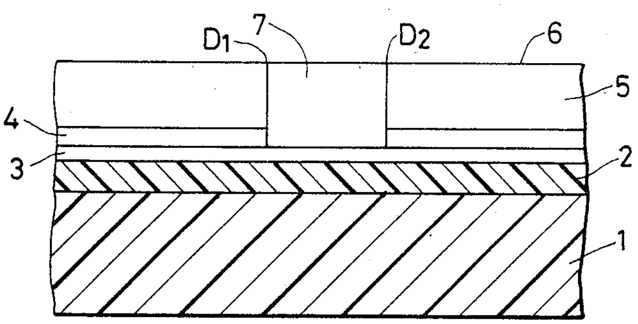
FIG. 2 is a sectional view taken and seen along arrows II—II' in FIG. 1.

FIGS. 1 and 2 are views for explaining one embodiment of a thermal head according to the present invention.

A substrate 1 is made of, e.g., ceramics, and a heat accumulating member 2 made of, e.g., glaze is layered thereon. A plurality of minute heating resistors 3 made of, e.g., a chromium-silicon (Cr-Si) mixture are juxtaposed on the surface of the heat accumulating member 2 in a manner to be spaced from each other. A pair of electrodes 4 made of an electrically conductive material such as aluminum are disposed on each of the heating resistors 3 at a predetermined interval. A protective member 5 is disposed as a layer so as to cover the heating resistors 3 and the electrodes 4. This protective member 5 consists of two layers; an oxidation-proof layer of silicon oxide ($SiO_2$) or the like for preventing the oxidation of the aforecited heating resistors 3 and electrodes 4, and a wear-proof layer of tantalum oxide ($Ta_2O_5$) or the like for preventing the wear of the oxidation-proof layer. With some materials, the protective member 5 can serve as both as oxidation-proof layer and a wear-proof layer. In this case, the protective member 5 is formed of a single layer.

Figure 3:
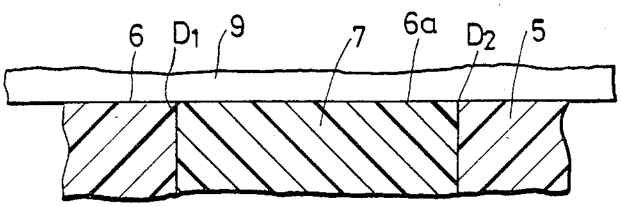
FIG. 3 is a partial crosssectional view of a contact between the head and a thermosensitive sheet.
Figure 4:
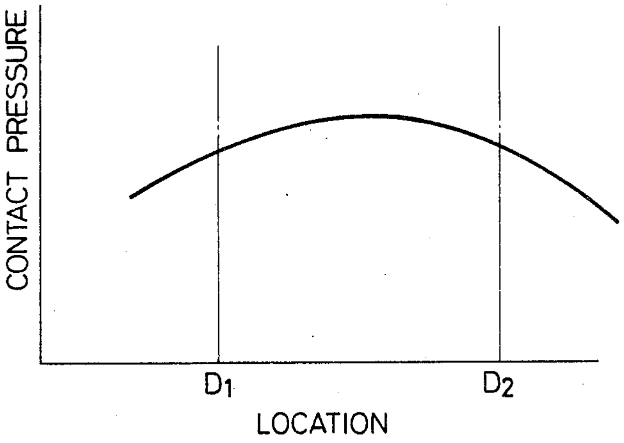
FIG. 4 is a graphical illustration of a relationship between a position of a contact head and a contact pressure.

Thermally conductive members 7 which are electrically insulating are disposed for respective heating dots in only those parts of the protective member 5 which correspond to the heating portions 3*a* of the heating resistors 3. Each member 7 forms a printing dot portion 6*a* one face of which is in thermal contact with the heating portion 3*a*, and the other face of which is exposed to and is even with a head surface 6. In the figures, $D_1$ and $D_2$ denote the ends of the printing dot portion 6*a*. FIGS. 3 and 4 illustrate the state of contact between the head and a thermosensitive sheet 9 such as inked film or heat-sensitive color developing paper and the distribution of contact pressures at that time, respectively. In FIG. 4, the axis of abscissas represents the position of contact between the head surface and the thermosensitive sheet 9, and the axis of ordinates the contact pressure. In the present embodiment, since the head surface 6 is flat as shown in FIG. 3, the thermosensitive sheet 9 such as inked film or heat-sensitive color developing paper lies in contact with the whole area of the printing dot portion of the head surface 6, and the contact pressure distribution at that time becomes substantially uniform and favorable also at the ends $D_1$, $D_2$ of the printing dot portion 6*a* as illustrated in FIG. 4. Therefore, a printed dot is free from non-uniformity in density and has a fixed size, to become a clearly demarcated one of high quality or one of high picture quality and high resolution.

The thermally conductive member 7 shown in FIGS. 1 and 2 is made of a material the thermal conductivity $\kappa$ of which is at least greater than that of the protective member 5, for example, SiC or $Al_2O_3$ the thermal conductivity of which has a value of 0.1–1 $cm^2/s$ or so. Accordingly, the thermally conductive member 7 is 10–1000 times greater in the thermal conductivity $\kappa$ than the surrounding protective member 5. Now, since the distance by which heat propagates during a period of time t is proportional to $\sqrt{\kappa \cdot t}$, the distance at which the heat gets within the identical period of time is 3–30 times greater in the thermally conductive member 7 than in the protective member 5. For this reason, at heating, the heat from the heating portion 3*a* of the heating resistor 3 is quickly transmitted to the printing dot portion 6*a* of the head surface 6, and conversely at cooling, the heat is quickly radiated, so that high speed printing is possible.

The temperature difference between the heating portion 3*a* of the heating resistor 3 and the printing dot portion 6*a* of the head surface is small, and the leakage of the heat to the surroundings decreases. In addition, since the printing dot portion 6*a* at the head surface 6 is not indented but is even as described before, the head comes into favorable touch with the thermosensitive sheet 9 such as inked film or heat-sensitive color developing paper. These lower the contact thermal resistance between the head surface 6 and the thermosensitive sheet 9 such as inked film or heat-sensitive color developing paper, so that input power to the heating resistor 3 can be remarkably reduced. This reduces the quantity of heat generation in the heating portion 3*a*, and can shorten a period of time required for cooling. Therefore, this also permits the high speed printing. Further, since the heat leaks little from the thermally conductive member 7 to the surrounding protective member 5, the temperature of the head surface 6 rises only in the part of the printing dot portion 6*a* formed of the thermally conductive member 7 and hardly rises in the surroundings. Accordingly the thermal independence of the respective printed dots at the head surface 6 is high, and the thermal conductivity is high, so that the temperatures of the printing dot portions 6*a* become substantially uniform. Thus, printing clearly demarcated and uniform in density is possible, and a high printing quality can be attained.

FIGS. 5–13 show other embodiments of the thermal head of the present invention, in which the same symbols as in FIGS. 1 and 2 indicate identical portions.

Figure 5:
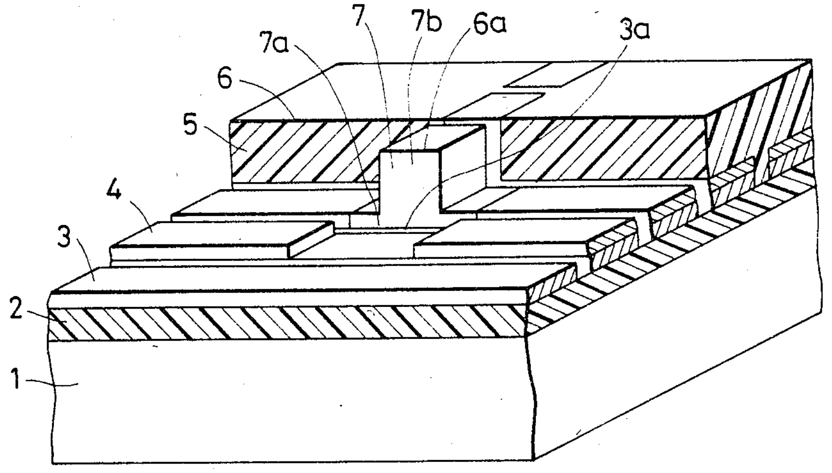
FIGS. 5 to 13 are perspective sectional views, partly cut away, each showing the essential portions of another embodiment of the thermal head according to the present invention.
Figure 6:
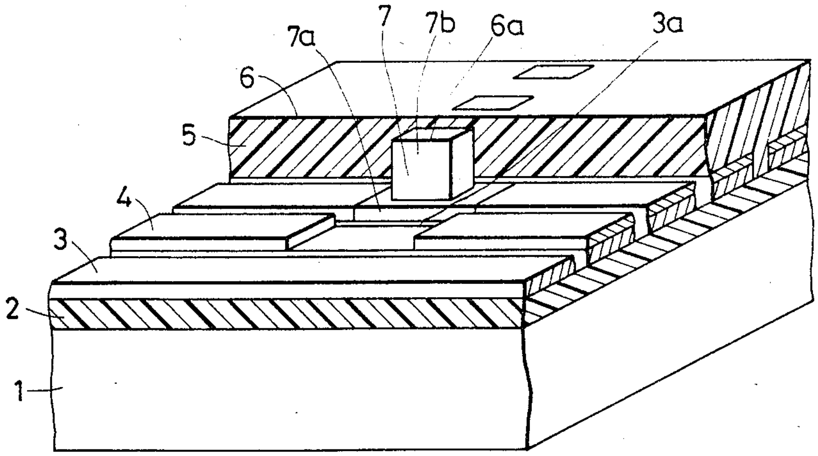
Figure 7:
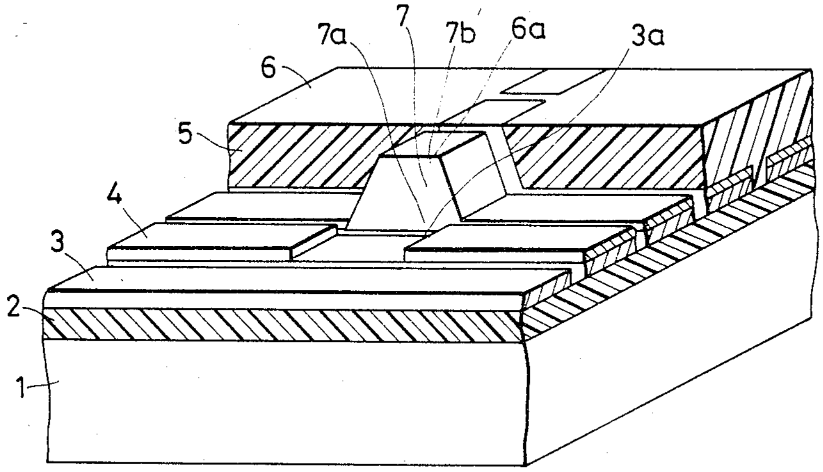
Figure 8:
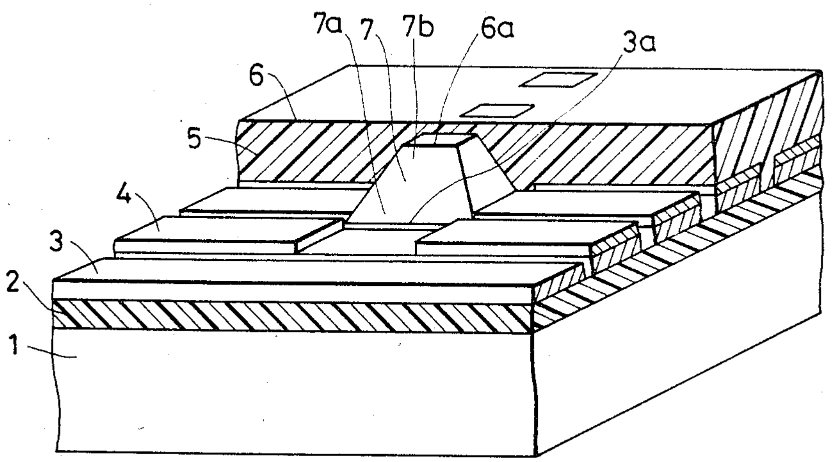

In the embodiments shown in FIGS. 5–9, the thermally conductive member 7 is so shaped that the surface area of a side 7*a* lying in contact with the heating portion 3*a* is larger than the surface area of a side 7*b* at the surface of the printing dot portion 6*a*. The examples shown in FIGS. 5 and 6 are such that the shape of the thermally conductive member 7 is steppedly changed, and the examples shown in FIGS. 7 and 8 are such that the shape of the thermally conductive member 7 is continuously changed. Such construction has the effects of the embodiment shown in FIG. 1. Moreover, since the heat reaches the printing dot portion 6*a* by passing within the thermally conductive member 7, the geometries of the printing dot portion 6*a* can be determined without any regard to the geometries of the heating portion 3*a*. Accordingly, printing of high resolution is permitted by making the geometries of the printing dot portion 6*a* small. Conversely, since the geometries of the heating portion 3*a* can be determined irrespective of those of the printing dot portion 6*a*, there is also the advantage that allowance is made for the setting of the resistance of the heating portion 3*a* or the applied power thereto. Apart from the above shapes of the thermally conductive members 7, similar effects are naturally attained even when the surface area of the side 7*a* of the thermally conductive member 7 lying in contact with the heating portion 3*a* is made larger than that of the side 7*b* at the surface of the printing dot portion 6*a* in such a way that only the sectional width of the thermally conductive member 7 in the direction of the adjacent dots is changed without changing the sectional width thereof in the direction of the electrodes.

Figure 9:
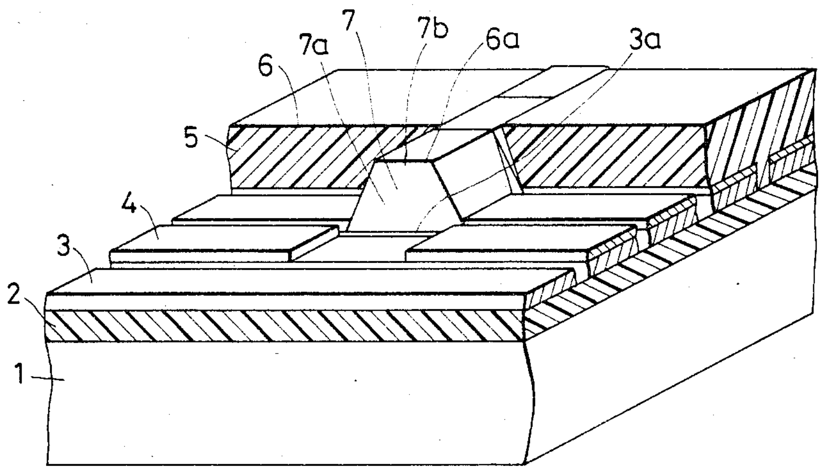

The embodiment shown in FIG. 9 is such that the sectional width of the side 7*a* of the thermally conductive member 7 lying in contact with the heating portion 3*a* is made greater than the sectional width of the side 7*b* at the surface of the printing dot portion 6*a* in the direction of the electrodes and smaller in the direction of the adjacent dots. The present embodiment brings forth effects similar to those of the respective embodiments mentioned before, and it can also enhance the printing quality or picture quality because the clearance between the adajcent printed dots becomes smaller.

Figure 10:
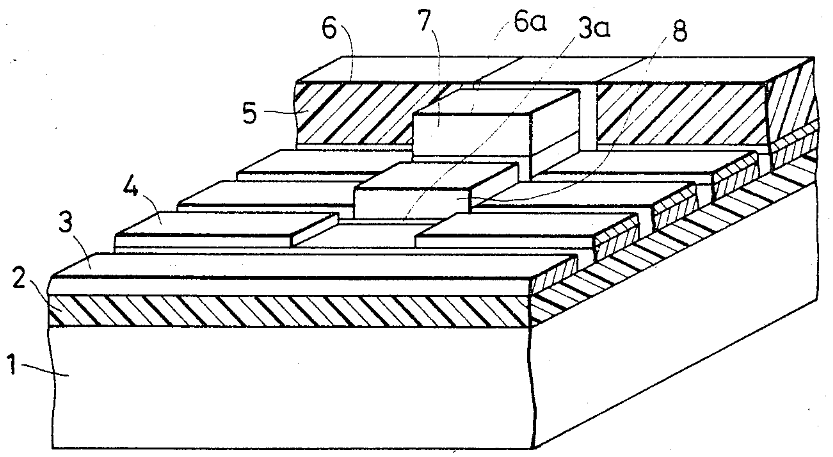

In any of the foregoing embodiments, the thermally conductive member 7 is placed directly on the upper surface of the heating portion 3*a* thereby to be thermally joined with the heating portion 3*a*. Therefore, the thermally conductive member 7 must be of an electrically insulating material. The embodiment shown in FIG. 10 is such that the thermally conductive member 7 is disposed on the upper surface of the heating portion 3*a* through an electrically insulating member 8 which is formed to be thinner than the protective member 5. Then, the thermally conductive member 7 may well be made of an electrically conductive material such as metal. Even when the electrically insulating member 8 is interposed between the heating portion 3*a* and the thermally conductive member 7 in this manner, a high thermal resistance is not formed because this electrically insulating member 8 is thinner than the protective member 5, so that effects similar to those of the structure of the embodiment shown in FIGS. 1 and 2 can be brought forth. On this occasion, the geometries of the printing dot portion 6*a* can be selected at will by changing the shape of the thermally conductive member 7 stepwise or continuously as illustrated in FIGS. 5–9.

Figure 11:
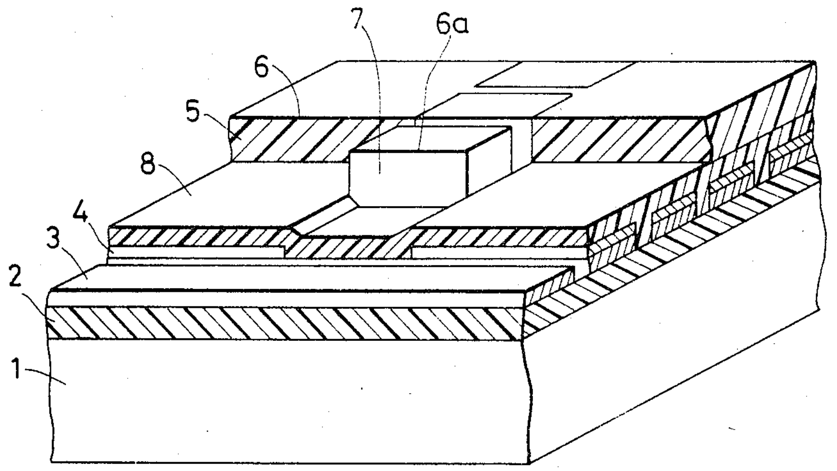

Although the embodiment shown in FIG. 10 has disposed the electrically insulating member 8 on only the heating dot portion 3*a* of the heating resistor 3, the embodiment shown in FIG. 11 is such that all the heating resistors 3 and the electrodes 4 are coated with the electrically insulating member so as to be covered, whereupon the protective member 5 is disposed and has the thermally conductive members 7 stacked on only its parts corresponding to the heating dot portions 3a. With such construction, since the electrically insulating member 8 functions as a sealing member, the external air does not enter through the interspace between the thermally conductive member 7 and the protective member 5. As compared with the foregoing embodiments, therefore, the embodiment lowers much the possibility of oxidation of the heating resistors 3 as well as the electrodes 4 and makes it possible to expect the effect of the enhancement of the lifetime of the head. Since, in this case, the electrically insulating member 8 is formed thinner than the protective member 5, a high thermal resistance does not arise, and effects similar to those of the embodiment shown in FIGS. 1 and 2 can be brought forth. On this occasion, the geometries of the printing dot portion 6a can be selected at will by changing the shape of the thermally conductive member 7 stepwise or continuously as shown in FIGS. 4–9.

Figure 12:
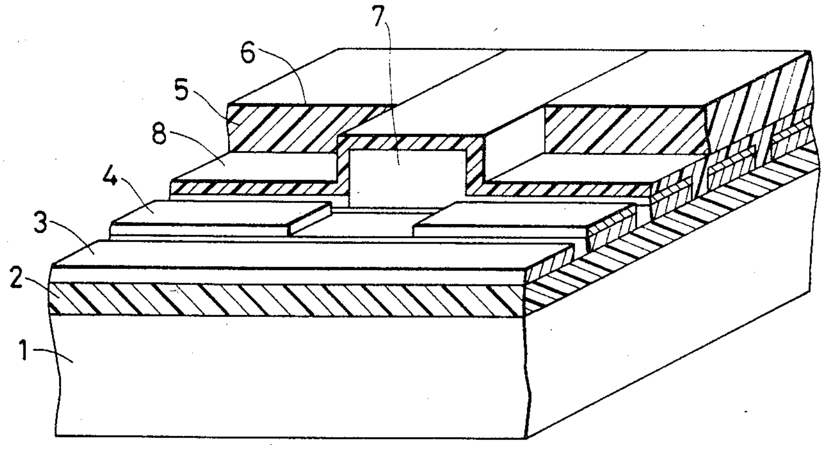
Figure 13:
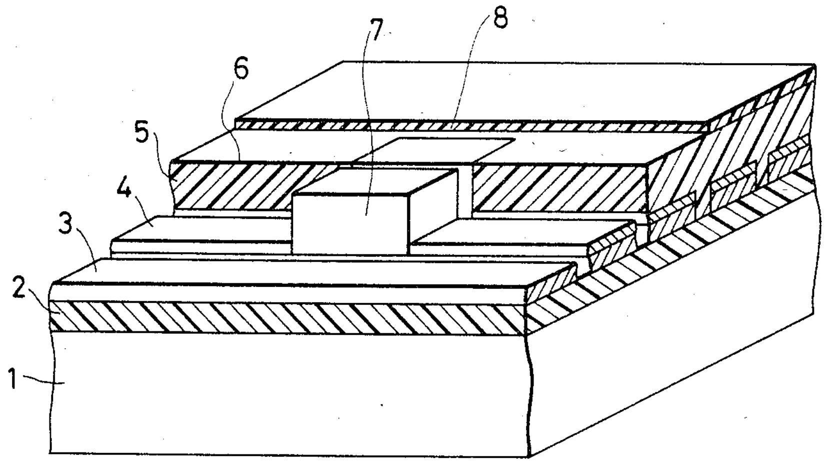

If the thermally conductive members 7 are of an electrically insulating material, the coating with the electrically insulating member 8 shown in FIG. 11 may be disposed so as to cover all the electrodes 4 and the thermally conductive member 7 as illustrated in FIG. 12 with such construction, effects similar to those of the example shown in FIG. 11 can be attained. In this case, the thickness of the protective member 5 needs to be increased by the thickness of the electrically insulating member 8 so as to render the head surface even with the uppermost surface of the member 8. Besides, the electrically insulating member 8 may well be disposed so as to cover the entire head surface 6 as illustrated in FIG. 13. With such construction, effects similar to those of the structure shown in FIG. 11 or FIG. 12 can be attained. In this case, the electrically insulating member 8 may well be replaced with an electrically conductive member.

As set forth above, according to the present invention, the touch between the head and the thermosensitive sheet is favorable owing to uniform contact pressure, and the temperature distribution of the printing head portions can be made favorable, so that printing of high quality and high resolution is permitted.

We claim:

1. In a thermal head having a substrate, a heat accumulating member which is disposed on the substrate, a plurality of heating resistors which are juxtaposed on the heat accumulating member in a manner to be spaced from each other, a plurality of electrodes which supply electric power to the heating resistors, and a protective member which prevents oxidation and wear of the heating resistors and the electrodes; the thermal head being characterized in that said protective member comprises printing dot portions which are formed independently of each other above the respective heating resistors without a finite contacting area therebetween, which printing dot portions are made of thermally conductive members higher in thermal conductivity than the other part of said protective member, the surfaces of said thermally conductive members being even with a head surface formed by the portion of the protective member other than said printing dot portions.

2. A thermal head according to claim 1, wherein said thermally conductive member is disposed so as to be thermally joined to said heating resistor with one face thereof held in direct contact with said heating resistor.

3. A thermal head according to claim 1, wherein said thermally conductive member is disposed with an electrically insulating member interposed between one face thereof and said heating resistor.

4. A thermal head according to any one of claims 1 to 3, wherein a surface of said thermally conductive member on a side thereof at a surface of said printing dot portion differs in size from a surface on a side thereof at said heating resistor.

5. A thermal head according to claim 4, wherein the shape of the surface of said thermally conductive member on the side at the side surface of said printing dot portion is made smaller than the shape of the surface thereof on the side at said heating resistor.

6. A thermal head according to claim 5, wherein said thermally conductive member is so formed that a sectional shape thereof becomes smaller stepwise from the heating resistor side toward the printing dot portion surface side.

7. A thermal head according to claim 5, wherein said thermally conductive member is so formed that a sectional shape thereof becomes smaller continuously from the heating resistor side toward the printing dot portion surface side.

8. In a thermal head having a substrate, a heat accumulating member which is disposed on the substrate, a plurality of heating resistors which are juxtaposed on the heat accumulating member in a manner to be spaced from each other, a plurality of electrodes which supply electric power to the heating resistors, and a protective member which prevents oxidation and wear of the heating resistors and the electrodes; the thermal head being characterized in that said protective member comprises printing dot portions which are formed independently of each other above the respective resistors without a finite contacting area therebetween, which printing dot portions are made of thermally conductive members higher in thermal conductivity than the other part of said protective member, the surfaces of said thermally conductive members being even with a head surface formed by the portion of the protective member other than said printing dot portions, and a sealing member for shielding said heating resistors and said electrodes from external air.

9. A thermal head according to claim 8, wherein said sealing member is disposed so as to cover said electrodes and said heating resistors.

10. A thermal head according to claim 8, wherein said sealing member is disposed so as to cover said electrodes and said thermally conductive members.

11. A thermal head according to claim 8, wherein said sealing member is disposed so as to cover said protective member and said thermally conductive members.

12. A thermal head according to any one of claims 8 to 11, wherein said sealing member is made of an electrically insulating material.

13. A thermal head according to claim 8, wherein said thermally conductive member is disposed so as to be thermally joined to said heating resistor with one face thereof held in direct contact with said heating resistor.

14. A thermal head according to claim 8, wherein said thermally conductive member is disposed with an electrically insulating member interposed between one face thereof and said heating resistor.

15. A thermal head according to any one of claims 8, 9, 10, 11, 13 and 14, wherein a surface of said thermally conductive member on a side thereof at a surface of said printing dot portion differs in size from a surface on a side thereof at said heating resistor.

16. A thermal head according to claim 15, wherein the shape of the surface of said thermally conductive member on the side at the surface of said printing dot portion is made smaller than the shape of the surface thereof on the side at said heating resistor.

17. A thermal head according to claim 16, wherein said thermally conductive member is so formed that a sectional shape thereof becomes smaller stepwise from the heating resistor side toward the printing dot portion surface side.

18. A thermal head according to claim 16, wherein said thermally conductive member is so formed that a sectional shape thereof becomes smaller continuously from the heating resistor side toward the printing dot portion surface side.

* * * * *